(12) United States Patent
Ku

(10) Patent No.: US 6,334,707 B1
(45) Date of Patent: Jan. 1, 2002

(54) TEMPERATURE SENSING DEVICE FOR TEST CYLINDER

(75) Inventor: Bryan Ku, Chung Ho (TW)

(73) Assignee: Second Source Supply Incorporated, Taoyuan (TW)

(*) Notice: Subject to any disclaimer, the term of this patent is extended or adjusted under 35 U.S.C. 154(b) by 0 days.

(21) Appl. No.: 09/619,532

(22) Filed: Jul. 19, 2000

(51) Int. Cl.[7] .............................. G01K 1/14; G01K 1/08
(52) U.S. Cl. ........................................ 374/208; 374/147
(58) Field of Search .............................. 374/208, 147, 374/163

(56) References Cited

U.S. PATENT DOCUMENTS 5,172,979 A * 12/1992 Barkley et al. ............. 374/147
5,454,641 A * 10/1995 Parker et al. ............... 374/120

FOREIGN PATENT DOCUMENTS

FR 2638522 * 5/1990 ................. 374/147

* cited by examiner

Primary Examiner—Christopher W. Fulton
Assistant Examiner—Gail Verbitsky
(74) Attorney, Agent, or Firm—Dougherty & Troxell

(57) ABSTRACT

A temperature sensing device for test cylinder is provided. The device includes a heat-transfer member that is covered with a top cover and is then set along with the top cover in a holding case to form a temperature sensing unit of the device. The heat-transfer member is provided at an upper side at a position best for correctly sensing temperature with an upper recess for receiving a sensing element therein, and at a lower side with channels for receiving conductors of a cable externally connected to and extended into the holding case. The upper recess of the heat-transfer member is filled with resin to enclose the sensing element therein and adhesively connect to a bottom surface of the top cover. The temperature-sensing unit has a concave top corresponding to a test cylinder to enable close and fit contact of the test cylinder with the top cover. The entire temperature sensing unit and the test cylinder are hold together by positioning them into a fixing unit of the device.

4 Claims, 5 Drawing Sheets

TEMPERATURE SENSING DEVICE FOR TEST CYLINDER

BACKGROUND OF THE INVENTION

The present invention relates to a temperature sensing device for test cylinder, and more particularly to a temperature sensing device having a sensing element being directly located at a position best for accurately sensing the temperature of the test cylinder.

Please refer to FIG. 1 in which a conventional temperature sensing bar 9 is shown. The temperature sensing bar 9 includes a length of straight hollow cylindrical casing 90 put around an outer periphery of an end of a multi-conductor cable 91, and a resistance-type thermal-sensitive sensing element 2 suspended in the casing 90 and connected to two conductors 911 of the cable 91. Epoxy resin is injected into the casing 90 to locate the originally suspended sensing element 2 so that it is not easily shifted in the casing 90. A temperature sensed by the temperature sensing bar 9 is sent by the cable 91 to a remote receiving end and be received thereat for logic operation. The following are three major problems with the conventional temperature sensing bar 9 that have not been effectively solved up to date:

1. When the temperature sensing bar 9 alone is used to sense a temperature, it would be difficult for the bar 9 to sense the temperature of a test cylinder 6, because both the bar 9 and the test cylinder 6 are round members and there is not a contact surface between them large enough for the bar 9 to accurately sense the temperature of other areas of the test cylinder 6 that do not contact with the bar 9.
2. The epoxy resin injected into the casing 90 to locate the sensing element 2 has a resistance larger than that of water and therefore results in the problem of failing to locate the sensing element 2 in the casing 90 at an ideal position due to the resistance and buoyancy of the epoxy resin. When the sensing element 2 is located in the casing 90 at a position too close to the cable 91, a distance from the close end of the casing 90 (i.e. the right end of the casing 90 in FIG. 1) to the sensing element 2 exceeds a predetermined valve that results in an increased impedance and accordingly a less sensitive transmission of heat and delayed heat transmission at the closed end of the casing 90. Moreover, when the resistance of the epoxy resin causes the sensing element 2 to deviate from an acceptable position to contact with an inner surface of the casing 90, the sensing element 2 shall have a largely reduced temperature sensing ability and thermal sensitivity.
3. The cable 91 connected to the temperature sensing bar 9 is frictionally fitted in the casing 90. When the bar 9 is used to sense temperature and therefore repeatedly subject to thermal expansion and contraction for a long term, there would be play occurred at joints of the casing 90 and the cable 91. Such play would cause the problem of poor waterproof to admit liquid into the casing 90 via the play and therefore wets and causes failure of the sensing element 2. Although the epoxy resin is adapted to bond the cable 91 and the casing 90 at their joint, the frequent thermal expansion and contraction of the bar 9 would still destruct the bond between the cable 91 and the casing 90 and eventually produce play between the two members to admit liquid into the casing 90.

To overcome the first one of the above-mentioned drawbacks existing in the conventional temperature sensing bar 9, a conventional temperature sensing structure shown in FIG. 1 and currently prevail in the market is developed. Such structure mainly includes a binding belt 85, a heat-transfer member 7, a seat 8, and a temperature sensing bar 9 as previously described. The seat 8 is provided at one end with an opening 80, at the other end with open-topped first and second recesses 81 and 82 that are axially communicable with each other, and at two longitudinal sides with two integrally and symmetrically formed side projections 83 that have vertical through holes 831 provided therein. The heat-transfer member 7 is in the form of a cubic block having a concave top surface 70 and an axially extended insertion hole 71 below the top surface 70. The binding belt 85 has an end formed of a through hole 851.

As can be seen from FIGS. 2 and 3, when the heat-transfer member 7 is set in the first recess 81(not shown)on the seat 8 and the temperature sensing bar 9 is upward extended through the opening 80 (not shown) at one end of the seat 8 into the second recess 82 and inserted into the insertion hole 71(not shown)on the heat-transfer member 7, the temperature sensing structure is ready for use. By positioning the test cylinder 6 on a top of the seat 8, a bottom of the test cylinder 6 will fitly and closely contact with the concave top surface 70 of the heat-transfer member 7. To bind the test cylinder 6 to the seat 8, the binding belt 85 is located above the test cylinder 6 with two ends thereof downward extended through the two through holes 831 on the two side projections 83 of the seat 8. Thereafter, one end of the binding belt 85 is extended through the hole 851 provided on the other end of the binding belt 85 to tighten the bind belt 85 around the test cylinder 6 and the seat 8.

A problem with the above-described temperature sensing structure is the test cylinder 6 is subject to repeated thermal expansion and contraction and would finally cause fatigue of the binding belt 85 that normally contacts with it, and the fatigued binding belt 85 would fail to tightly bind the test cylinder 6 and the heat-transfer member 7 together to result in inaccurate sensing of temperature. A common example of such situation is an air conditioner having temperature-control or thermostatic-control ability. If a temperature sensing structure in the air conditioner fails to accurately and correctly sense a room temperature, the room temperature regulated by the air conditioner would be either too high or too low. It is therefore very important to always keep the test cylinder and the heat-transfer member of the temperature sensing structure tightly contacting with each other.

Since the currently prevail temperature sensing structure still employs the conventional temperature sensing bar 9 in sensing the temperature of the test cylinder 6, the second and the third drawbacks as previously described still exist and could not be effectively overcome. That is, the sensing element 2 could not be accurately located in the temperature sensing bar 9 and it is possible liquid would permeate into the temperature sensing bar 9 to damage the latter.

SUMMARY OF THE INVENTION

A primary object of the present invention is to provide a temperature sensing device for test cylinder that includes a sensing element that could be directly accurately located at a desired position best for correctly sensing a temperature of the test cylinder, and a structure that allows automatic draining of any liquid permeated into the device for the device to always function well.

Another object of the present invention is to provide a temperature sensing device for test cylinder that includes a heat-transfer member having a concave top surface that is the only surface closely and fitly contacting with the test cylinder for temperature sensing purpose and therefore enables accurate sensing of temperature of the test cylinder. A further object of the present invention is to provide a temperature sensing device for test cylinder that includes a temperature sensing unit and an elastic fixing unit, so that the temperature sensing unit and the test cylinder are entirely and perfectly received in the fixing unit to be always firmly bound together by the fixing unit.

A still further object of the present invention is to provide a temperature sensing device for test cylinder that includes a heat-transfer member having multiple channels provided at a bottom side for accommodating multiple conductors therein, so that a signal representing the temperature sensed by the sensing element can be sent to and received at multiple remote receiving ends.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
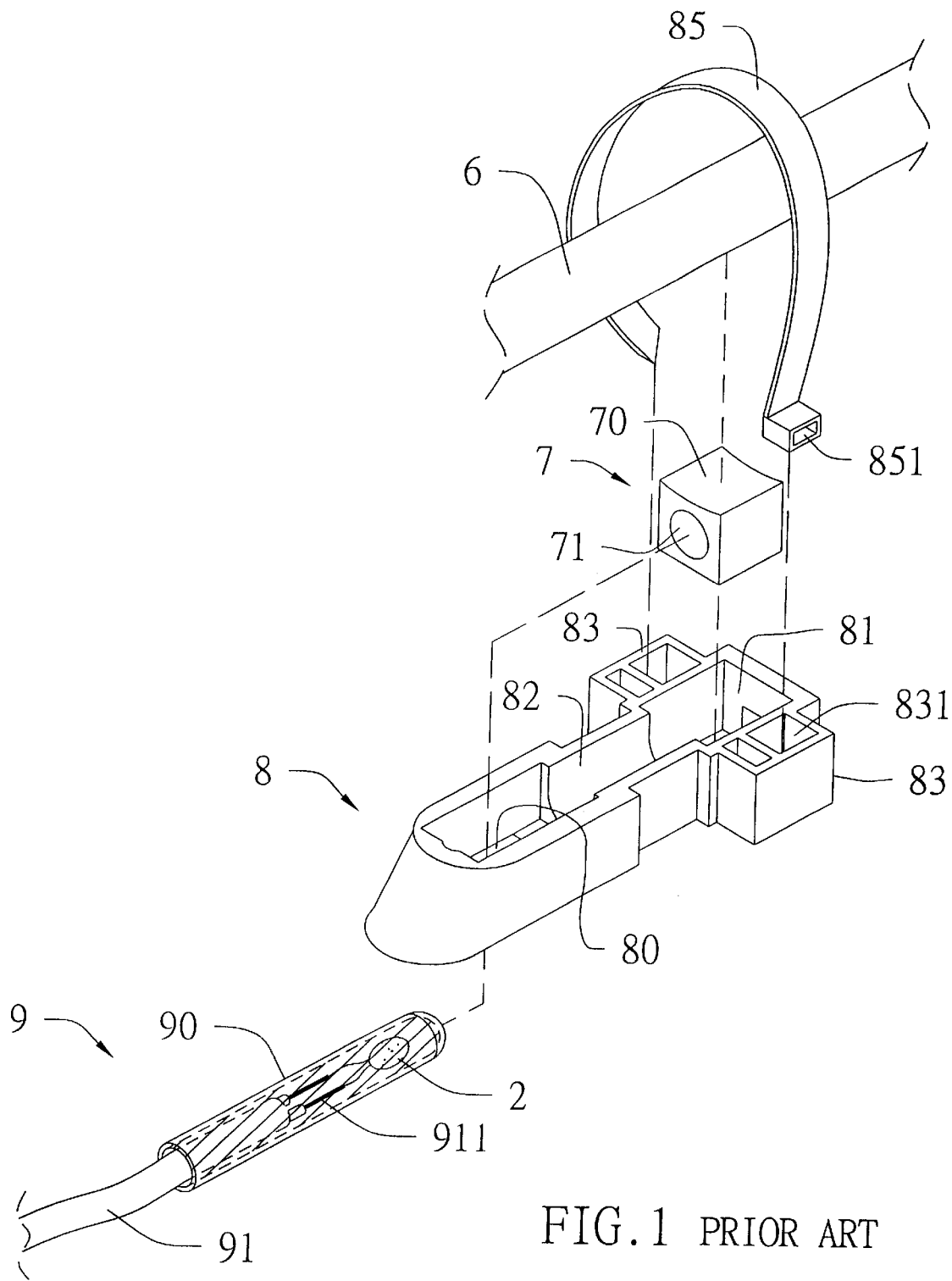
FIG. 1 is an exploded perspective of a conventional temperature sensing structure.
Figure 2:
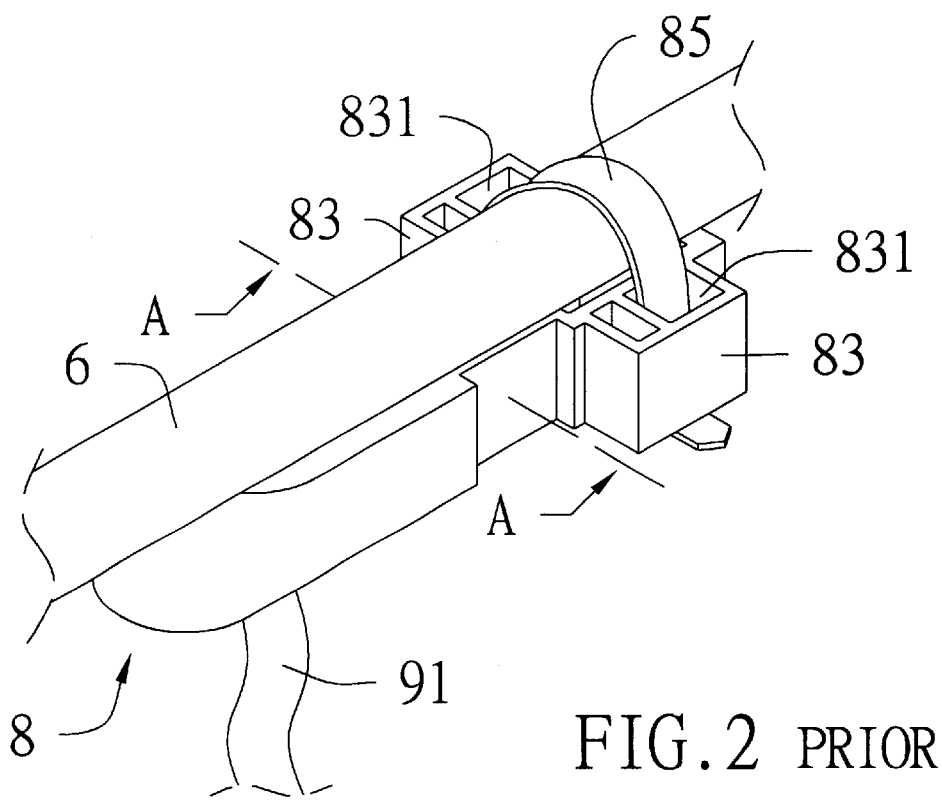
FIG. 2 is an assembled perspective of the conventional temperature sensing structure of FIG. 1.
Figure 3:
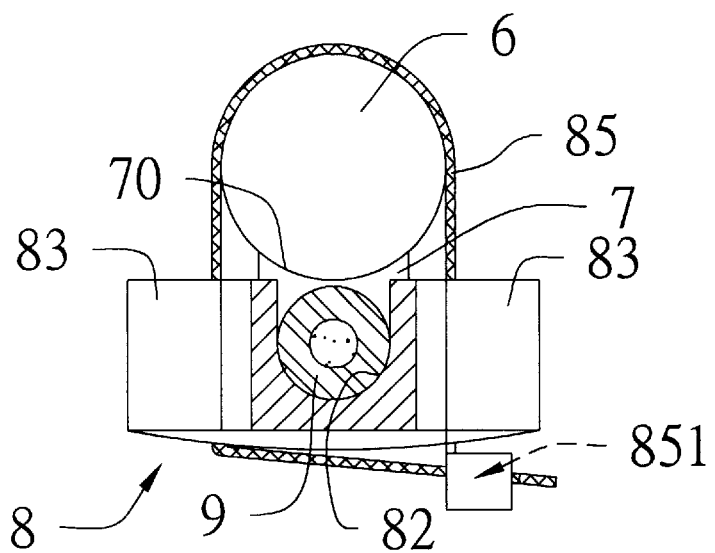
FIG. 3 is a "A—A" sectional view of the conventional temperature sensing structure of FIG. 2.
Figure 4:
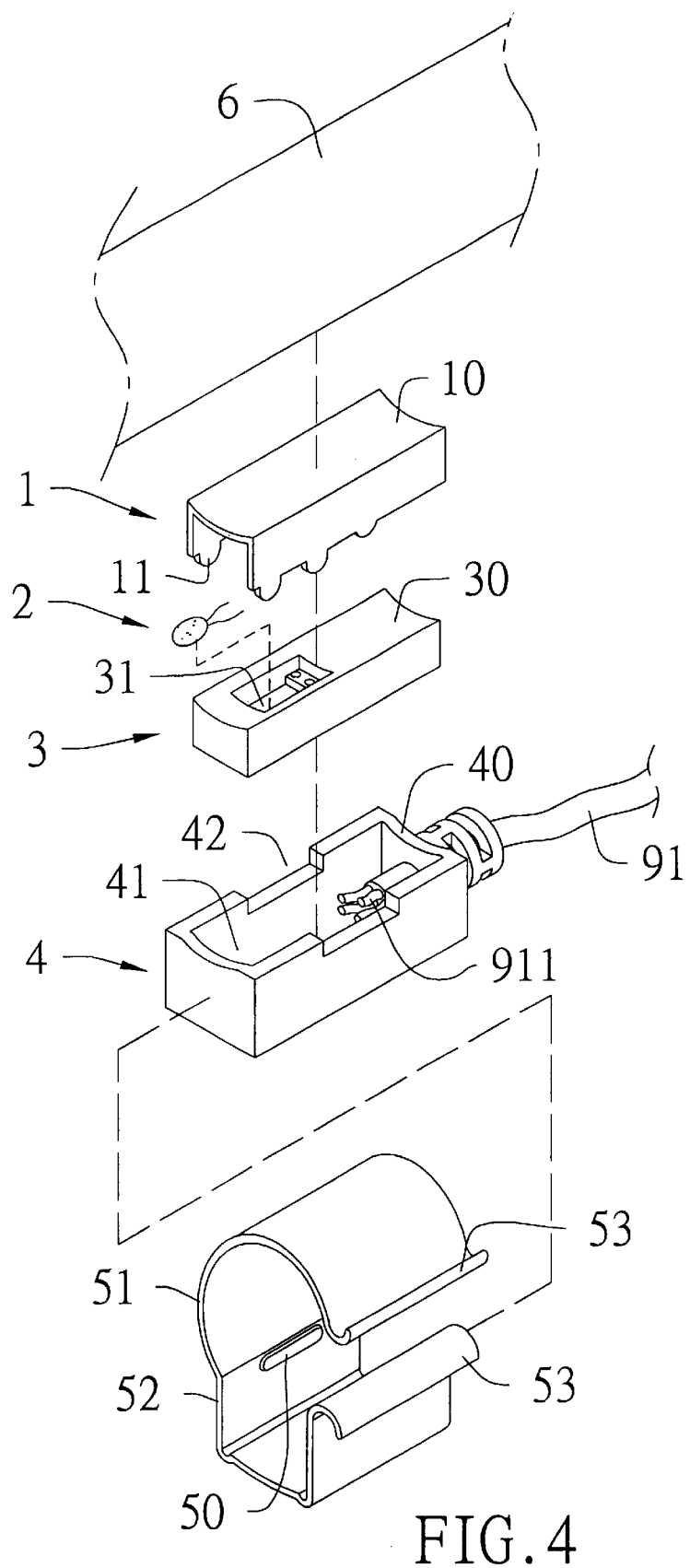
FIG. 4 is an exploded perspective of a temperature sensing device for test cylinder according to the present invention.
Figure 7:
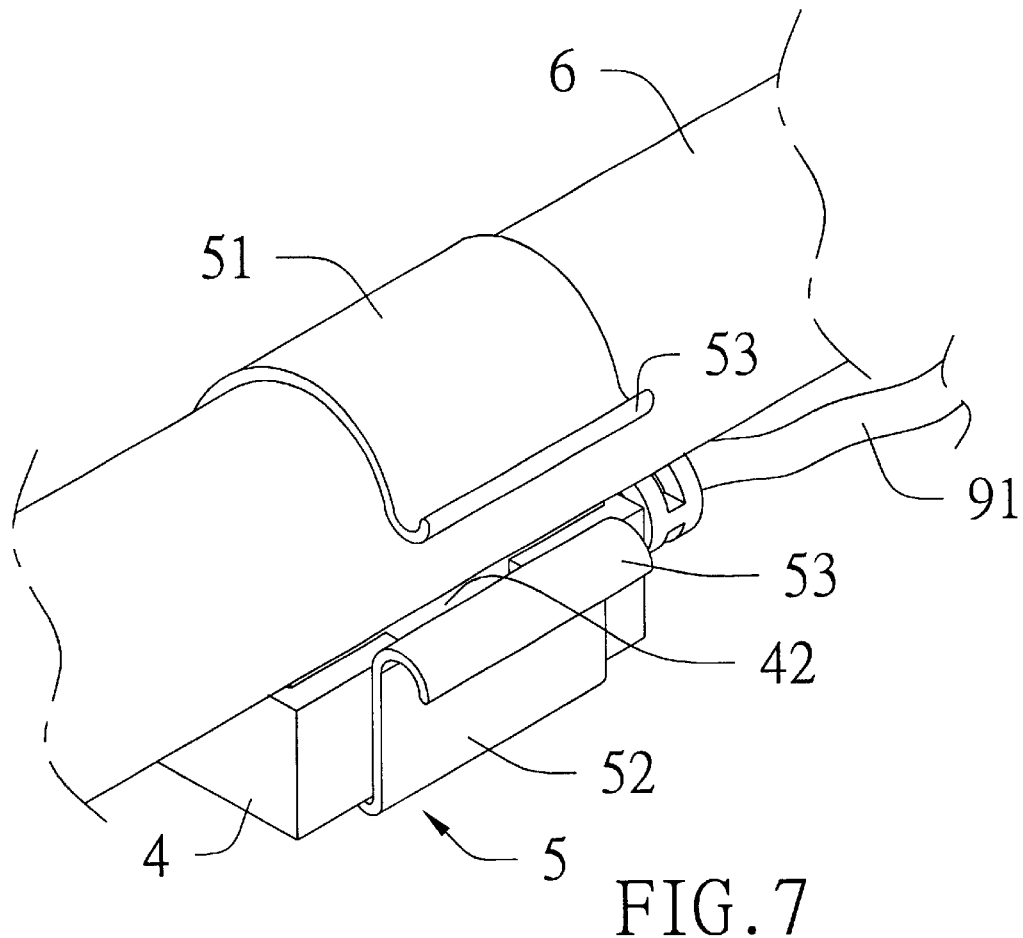
FIG. 7 is a fragmentary assembled perspective of the temperature sensing device of FIG. 4.
Figure 8:
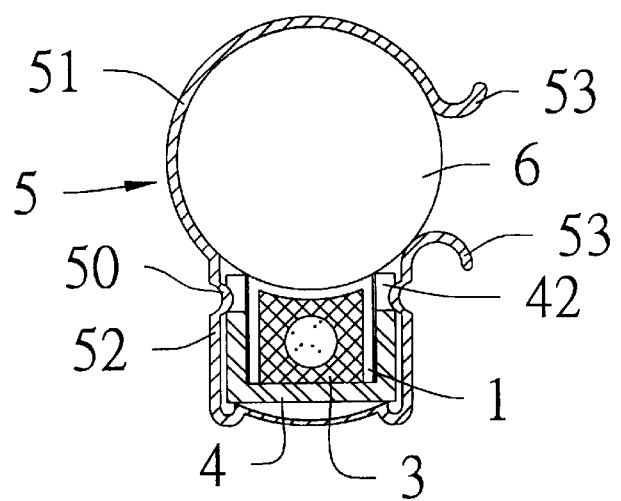
FIG. 8 is a sectional view of FIG. 7.

Please refer to FIGS. 4, 7, and 8 in which there is shown a temperature sensing device for a test cylinder according to the present invention. The temperature sensing device includes a temperature sensing unit and a fixing unit 5. The temperature sensing unit includes a top cover 1, a sensing element 2, a heat-transfer member 3, and a holding case 4.

The top cover 1 has a generally n-shaped cross section and is provided at lower edges of two longitudinal walls thereof with a plurality of bendable lugs 11. A top surface of the top cover 1 is concaved to provide an inward curve surface 10 having a curvature matching with a curvature of a test cylinder 6.

Figure 5:
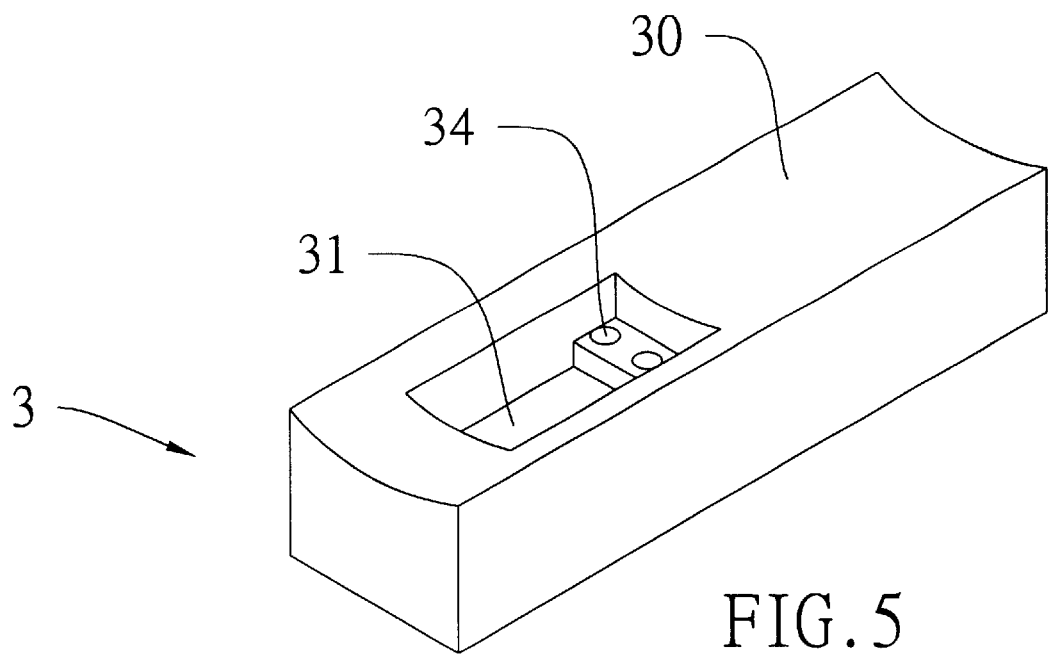
FIG. 5 is a top perspective view of a heat-transfer member included in the temperature sensing device of FIG. 4.
Figure 6:
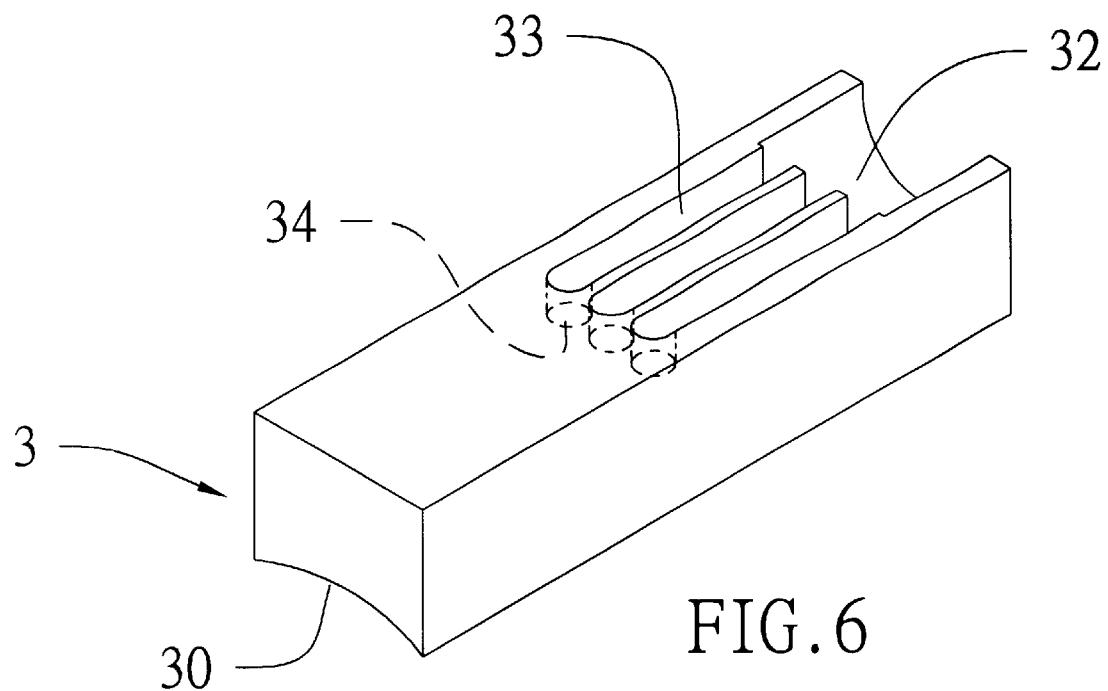
FIG. 6 is a bottom perspective view of a heat-transfer member included in the temperature sensing device of FIG. 4.

The heat-transfer member 3 is provided at an upper side near a first end thereof with a recess 31 for receiving the sensing element 2, so that the sensing element 2 is accurately located in the recess 31. The heat-transfer member 3 is also provided at a lower side near a second end opposite to the first end with a curve-bottomed recess 32, as can be seen from FIG. 6. A plurality of channels 33 are formed at the lower side of the heat-transfer member 3 with one end thereof communicable with the curve-bottomed recess 32 and the other end thereof formed of a through hole 34 each to vertically extend through the heat-transfer member 3 to communicate with the recess 31 at the upper side of the heat-transfer member 3, as can be seen from FIGS. 5 and 6. A top surface of the heat-transfer member 3 is concaved to provide an inward curve surface 30 having a curvature corresponding to that of the curve surface 10 of the top cover 1, so that the heat-transfer member 3 and the top cover 1 can closely and fitly contact with each other at the curve surfaces 30 and 10.

The sensing element 2 is positioned in the upper recess 31 of the heat-transfer member 3 at a position that enables most accurate sense of temperature of a test cylinder 6 attached to the temperature sensing device.

The holding case 4 is open-topped and defines a receiving space 41 therein. The holding case 4 is provided at upper edges of two longitudinal walls thereof with two symmetrical cuts 42. A multi-conductor cable 91 is connected to an end of the holding case 4 with multiple conductors 911 thereof extending into the receiving space 41. Upper edges of two end walls of the holding case 4 are concaved to form two inward curve edges 40. The curve edges 40 have a curvature corresponding to that of the curve surfaces 10 and 30, so that an assembly of the holding case 4, the heat-transfer member 3 and the top cover 1 has a curve top adapted to closely and fitly receive the test cylinder 6 thereonto, as shown in FIG. 8.

To locate the sensing element 2 in the upper recess 31 of the heat-transfer member 3, first inject epoxy resin into the recess 31 to enclose the sensing element 2. Then, position the top cover 1 on the top surface of the heat-transfer member 3 and bend the a plurality of lugs 11 of the top cover 1 in such a manner that the top cover 1 is firmly attached to the entire top surface 30 of the heat-transfer member 3 with the epoxy resin in the recess 31 contacting with and adhesively bonding a bottom surface of the top cover 1 to the heat-transfer member 3. Finally, the heat-transfer member 3 filled with epoxy resin and having the top cover 1 bonded thereto is set in the receiving space 41 of the holding case 4 to form the temperature sensing unit of the present invention. At this point, an end of the receiving space 41 of the holding case 4 having the multi-conductor cable 91 connected thereto is located below the curve-bottomed recess 32 at the lower side of the heat-transfer member 3 with the conductors 911 separately fitly set in the channels 33. Free ends of the conductors 911 upward extend through the through holes 34 into the upper recess 31 to connect to the sensing element 2. With these arrangements, there is not any object below the heat-transfer member 3 to hinder the latter from completely fitly contacting with and attaching to an inner bottom surface of the holding case 4, and the curved top surface 10 of the top cover 1 is completely flush with the two curved upper edges 40 of the holding case 4.

As shown in FIGS. 4, 7 and 8, the fixing unit 5 is formed by integrally bent a metal material into a predetermined configuration. The fixing unit 5 is formed at a lower part with a generally U-shaped holder portion 52 for receiving the temperature sensing unit therein, and at an upper part with a generally C-shaped clamp portion 51 for elastically confining the test cylinder 6 to the fixing unit 5 between the clamp portion 51 and the temperature sensing unit received in the holder portion 52. The clamp portion 51 and the holder portion 52 are integrally connected to each other at one longitudinal side. Another sides of the clamp portion 51 and of the holder portion 52 opposite to the connected side form two outward curled lip portions 53 that are elastically spaced from each other. The test cylinder 6 may be easily positioned into the fixing unit 5 below the clamp portion 51 to be firmly clamped in place by pushing the test cylinder 6 toward the two lip portions 53 to pass therebetween. The holder portion 52 of the fixing unit 5 is provided at inner wall surfaces of two longitudinal sides at predetermined positions with two symmetrically inward projected ribs 50, such that the ribs 50 engage with the cuts 42 on the two longitudinal walls of the holding case 4, as can be seen from FIG. 8, to securely hold the temperature sensing unit in the holder portion 52 of the fixing unit 5.

Please refer to FIGS. 7 and 8. When the temperature sensing unit is firmly received in the holder portion 52 of the fixing unit 5, the temperature sensing device of the present invention is ready for use. When the test cylinder 6 is positioned into the fixing unit 5 below the clamp portion 51 by pushing it through the two lip portions 53, the concave top surface 10 of the top cover 1 having the same curvature as that of the test cylinder 6 allows the test cylinder 6 to stably seat on and fitly and completely contact with the concave top surface 10 of the top cover 1. Meanwhile, since the concave top surface 30 of the heat-transfer member 3 also has a curvature the same as that of the concave top surface 10 of the top cover 1, the bottom surface of the top cover 1 and the concave top surface 30 of the heat-transfer member 3 are also adapted to completely fitly contact with each other. Whereby, heat produced by the test cylinder 6 laid on the top cover 1 is fully transferred to the heat-transfer member 3 via the top cover 1 to evenly distribute over the entire heat-transfer member 3 and be sensed by the sensing element 2 located on the heat-transfer member 3 at a position best for accurate sensing of the temperature of the test cylinder 6. A temperature sensed by the sensing element 2 is then sent by the conductors 911 to a remote receiving end and be received thereat.

The following are some advantages of the temperature sensing device for test cylinder according to the present invention:

A. Since the heat-transfer member 3 is disposed in the receiving space 41 of the holding case 4, only the concave top surface 10 of the top cover 1 contacts with the test cylinder 6. Other surfaces, such as the two longitudinal walls of the top cover 1 provided with lugs 11 and the lower side of the heat-transfer member 3, all are isolated by the holding case 4 from sensing any temperature. Therefore, a temperature sensed by the temperature sensing unit of the present invention would not lose its accuracy due to influences of other surfaces on the temperature sensing unit.

B. The temperature sensing device for test cylinder according to the present invention has a structure adapted to prevent liquid from easily permeating thereinto. Even if there is any liquid permeating into the device, the permeated liquid could be automatically drained via clearances between the associated top cover 1 and heat-transfer member 3 and the holding case 4.

C. A position on the heat-transfer member 3 best for the sensing element 2 to sense a temperature of a test piece has been formed of a recess 31 for receiving the sensing element 2 therein. Therefore, once the sensing element 2 is positioned in the recess 31, the entire device is in an optimum condition for sensing the temperature of the test cylinder 6.

D. Since the temperature sensing unit of the present invention, that is, the assembly of the top cover 1, the sensing element 2, the heat-transfer member 3 and the holding case 4, could be completely securely fitted in the fixing unit 5, the sensing of a temperature of the test cylinder 6 could be proceeded without the risk of a test cylinder 6 loosened from the temperature sensing device.

It is understood that the present invention is illustrated with the description of a preferred embodiment thereof, and it is contemplated that many changes and modifications in the described embodiment can be carried out without departing from the scope of the invention that is intended to be limited only by the appended claims.

What is claimed is:

1. A temperature sensing device for test cylinder, comprising a heat-transfer member covered by a top cover, said top cover being provided at lower edges of two longitudinal walls thereof with a plurality of lugs that are adapted to be bent to firmly bind said top cover to said heat-transfer member; said top cover and said heat-transfer member that are firmly bound together by said lugs being entirely set in a receiving space defined by a holding case to form a temperature sensing unit of said temperature sensing device; said holding case having a multi-conductor cable externally connected to an end thereof with multiple conductors thereof extended into said receiving space; said heat-transfer member being provided at an upper side at a position best for correctly and accurately sensing a temperature of a test cylinder with an upper recess for receiving a sensing element therein, and at a lower side at a position opposite to said upper recess with at least one channel for accommodating conductors of said multi-conductor cable therein, said conductors being upward extended through holes provided at an end of said at least one channel into said upper recess to connect to said sensing element; said sensing element being located in said upper recess by injecting a predetermined type of resin into said upper recess to enclose said sensing element and adhesively bond a bottom surface of said top cover to said upper recess; and said top cover and said heat-transfer member being provided with concave top surfaces and said holding case being provided with concave top edges at two ends thereof, said concave top surfaces and said concave top edges having the same curvature as that of an outer surface of said test cylinder positioned on said top cover to enable close and fit contact of said test cylinder with said concave top surface of said top cover.

2. A temperature sensing device for test cylinder as claimed in 1, further comprising a fixing unit for firmly holding said temperature sensing unit and said test cylinder together; said fixing unit being integrally formed from a metal material that is bent into a predetermined configuration and including a U-shaped lower holder portion for receiving said temperature sensing unit therein and a C-shaped upper clamp portion for elastically clamping said test cylinder between said clamp portion and said temperature sensing unit received in said holder portion; said clamp portion and said holder portion being integrally connected to each other at one longitudinal side, and another longitudinal side of said clamp portion and of said holder portion being outward curled to provide two elastically spaced lip portions.

3. A temperature sensing device for test cylinder as claimed in 2, wherein said holder portion of said fixing unit are provided at two longitudinal walls with two inward protruded and axially extended ribs, and said holding case of said temperature sensing unit being correspondingly provided at two longitudinal walls with two cuts, such that said ribs on said fixing unit and said cuts on said holding case of said temperature sensing unit engage with one another for said temperature sensing unit to securely set in said holder portion of said fixing unit.

4. A temperature sensing device for test cylinder as claimed in 1, wherein said heat-transfer member is provided at the lower side with a plurality of said channels to allow a signal representing the temperature sensed by said sensing element to be sent to and received at multiple remote receiving ends.

* * * * *